UNITED STATES PATENT OFFICE.

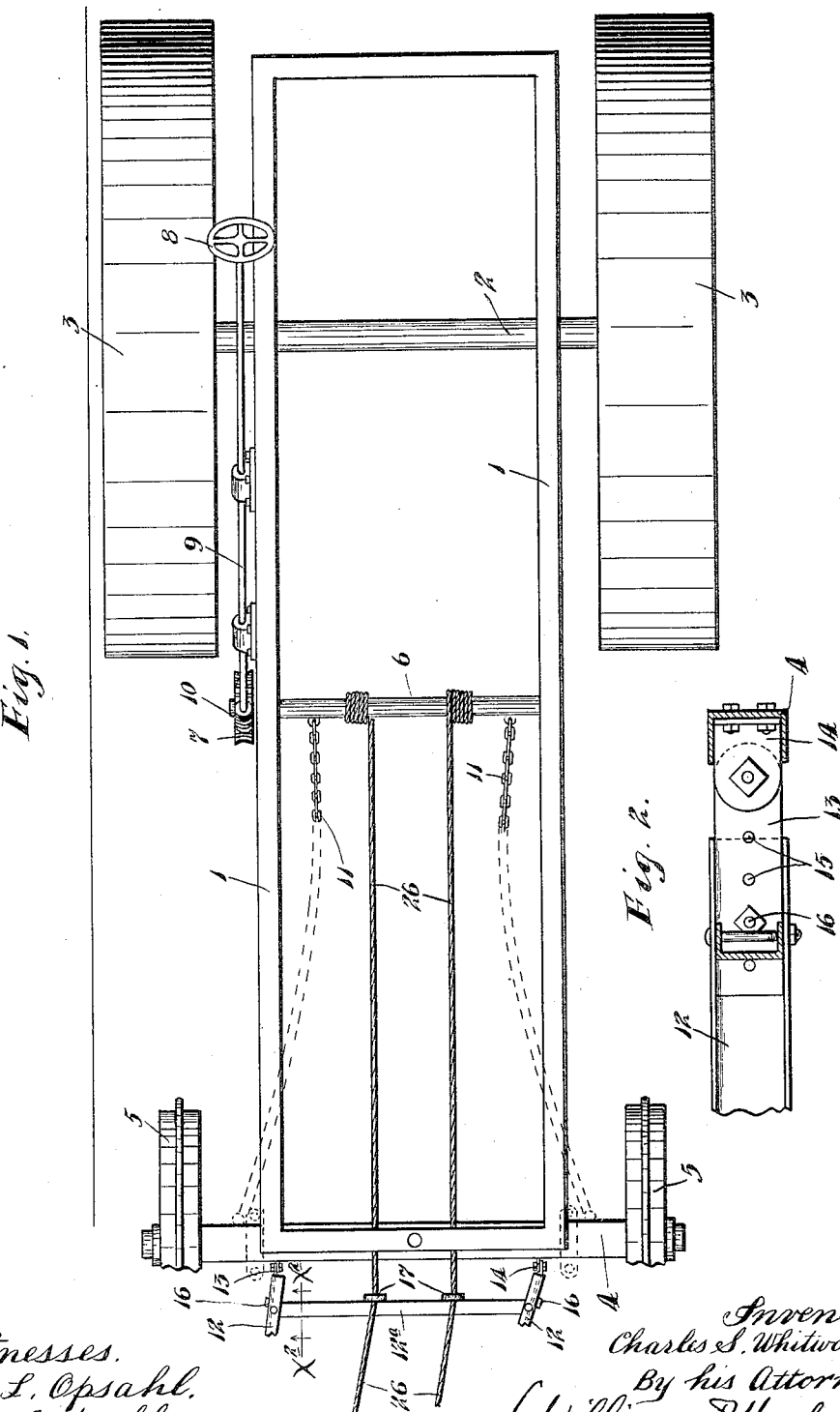

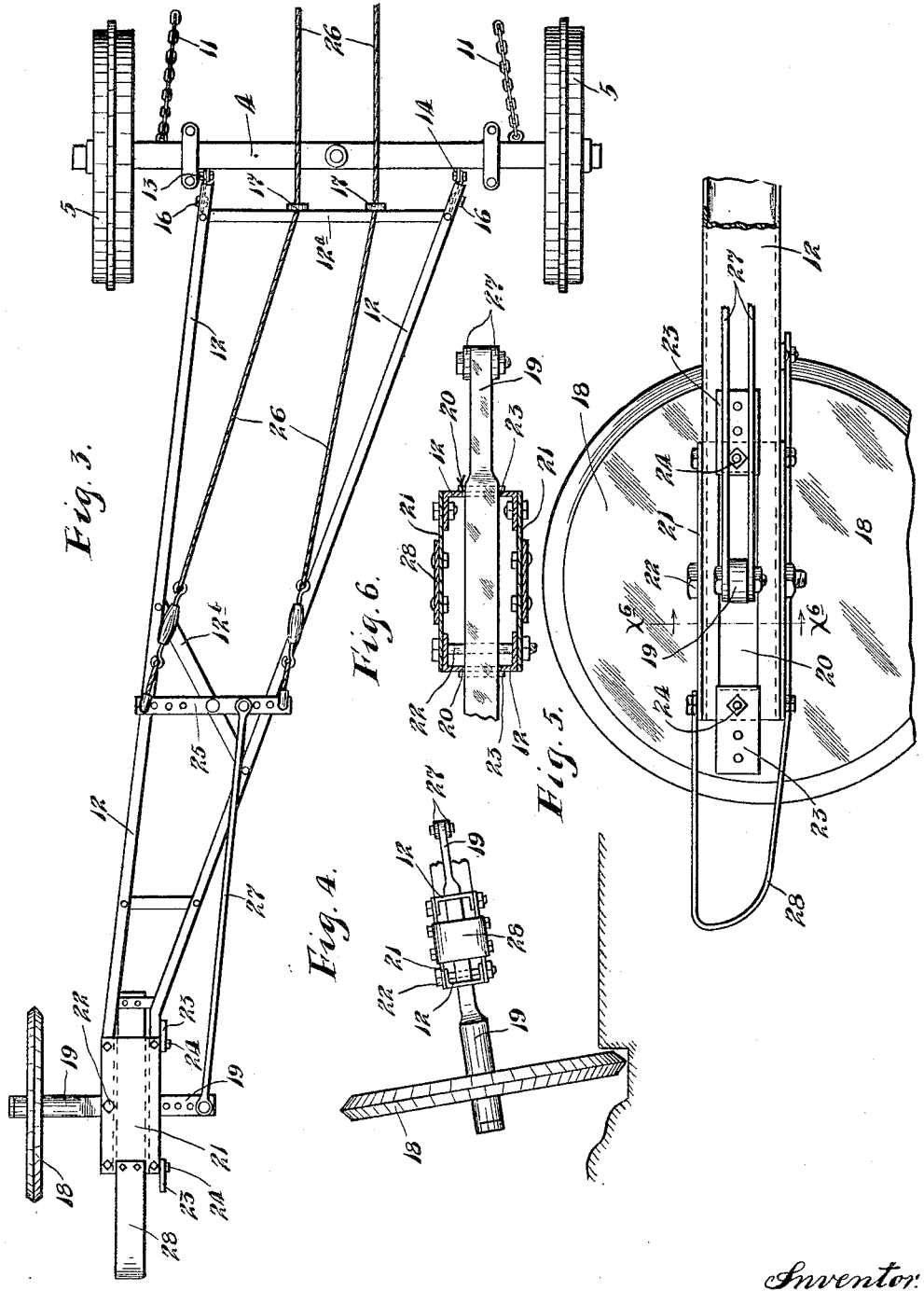

CHARLES S. WHITWORTH, OF CEDAR FALLS, IOWA, ASSIGNOR TO M. RUMELY COMPANY, OF LAPORTE, INDIANA, A CORPORATION OF INDIANA.

TRACTION-ENGINE GUIDE.

1,132,139.   Specification of Letters Patent.   Patented Mar. 16, 1915.

Application filed June 4, 1912. Serial No. 701,500.

*To all whom it may concern:*

Be it known that I, CHARLES S. WHITWORTH, a citizen of the United States, residing at Cedar Falls, in the county of Blackhawk and State of Iowa, have invented certain new and useful Improvements in Traction-Engine Guides; and I do hereby declare the following to be a full, clear, and exact description of the invention, such as will enable others skilled in the art to which it appertains to make and use the same.

My present invention has for its object to provide an improved guiding or steering mechanism for traction engines, and is in the nature of an improvement on the device disclosed and claimed in my prior co-pending application, S. N. 658,109, filed of date, November 2nd, 1911, entitled "steering device for traction engines."

The invention is illustrated in the accompanying drawings wherein like characters indicate like parts throughout the several views.

Referring to the drawings, Figure 1 is a plan view showing an ordinary traction engine, such as are frequently used in connection with gang plows, some parts being removed, but showing the manner of connecting my improved guide to the said engine; Fig. 2 is an enlarged detail in section on the line $x^2$ $x^2$ on Fig. 1. Fig. 3 is a plan view showing the front axle and guide attachment and coöperating connections; Fig. 4 is a detail view of the guide in front elevation, some parts being broken away; Fig. 5 is a side elevation showing the front end portion of the guide, some parts being broken away; and Fig. 6 is a transverse section taken on the line $x^6$ $x^6$ on Fig. 5.

Of the parts of the traction engine, the numeral 1 indicates the main frame, the numeral 2 the rear axle, and the numeral 3 the rear or traction wheels, the numeral 4 the pivoted front axle, and the numeral 5 the front wheels.

The numeral 6 indicates a transversely extended windlass shaft suitably journaled to the sides of the main frame 1, and provided at one end with a worm gear 7.

The numeral 8 indicates the hand operated steering wheel having a rod 9 journaled in suitable bearings on the side of the frame 1 and provided with a worm 10 that meshes with the worm gear 7.

The numeral 11 indicates the steering chains attached at their front ends to the pivoted front axle, and at their rear ends attached to and reversely wound upon the windlass shaft 6.

The parts so far noted are those of an ordinary traction engine.

The so-called guide arm which carries the guide wheel at its front end, extends forwardly from the front axle 4 of the traction engine and is hinged thereto for vertical movements, but partakes of the horizontal oscillatory movements of said axle. This guide arm, as shown, is in the form of a forwardly converging skeleton frame 12, the longitudinal bars of which, at their rear ends, are provided with metal hinge straps 13, which, as shown, are pivotally connected to hinge lugs 14 rigidly secured to the said front axle 4. For an important purpose, the hinge straps 13 are adjustably connected to the bars of the said frame 12, being, as shown, provided with longitudinally spaced perforations 15, through any of which, short nut-equipped bolts 16 are adapted to be passed to rigidly but adjustably connect the said parts 12 and 13. Also, the side bars of the frame 12 are preferably made of channel iron and the hinge straps 13 are fed between the channels thereof. Also, the rear ends of the arm bars 12 are rigidly tied together by a cross bar 12ª having cable guides 17 thereon.

The guide wheel 18, which is adapted to follow a furrow, or to run on level ground, is journaled on the outer end of a guide axle 19 that works through longitudinal slots 20, formed in the front ends of the longitudinal bars of the guide arm 12, (see particularly, Figs. 5 and 6). Upper and lower plates 21 are bolted or riveted to the flanges of the front ends of the longitudinal bars 12 and the guide axle 19 is intermediately pivoted thereto by a bolt 22.

The guide wheel 18 should stand obliquely, as shown in Fig. 4. In my prior application, this was accomplished by bending the guide axle 19, but in the present construction, it is accomplished with a straight guide axle which is set obliquely by giving to the front end of the guide arm 12 an axial twist, so as to set the front ends of the longitudinal bars thereof in oblique positions, as shown in Fig. 4. The oscillatory movements of the axle 19 are limited by adjustable stops 23, shown as provided with longitudinally spaced perforations through any of which, and the webs of the bars 12, nut-equipped bolts 24 are passed.

Intermediately pivoted to one of the transverse bars 12ᵇ of the guide arm 12 is an intermediate lever 25, the ends of which are connected to the front end of cables 26. These cables 26 are passed through the guides 17 on the transverse bar 12ᵃ, and their rear ends are secured to and reversely wound upon the windlass shaft 6. The front ends of the said cables 26 are adapted to be connected to any one of several perforations in the ends of the said lever 25. A link 27 is pivotally connected at its front end to the inner end of the guide axle 19, and its rear end is pivotally connected to one side of the intermediately pivoted lever 25. The pivotal connections between the link 27 and the guide axle 19 and lever 25 is made adjustable by longitudinally spaced perforations in the said members 19 and 25. By these adjustments, the amount of movement which will be given to the axle 19, by a given movement of the hand wheel 8 and windlass shaft 6, may be varied.

Rigidly secured to the front end of the guide arm 12 and projecting forwardly therefrom is a guard shoe 28, which, as shown, is made from a piece of flat metal bent approximately U-shaped, with its ends bolted to top and bottom plates 21 of the said arm 12. This shoe performs an important function, to-wit, it will engage with the ground and slide over the ground in case the guide wheel 18 should drop into a depression in the ground and will thus prevent the front end of the guide arm from being embedded in the ground, no matter how low it may be dropped.

The operation of the improved mechanism is substantially as follows: The guide cables 26 should normally be quite taut, while the cables or chains 11 should normally have considerable slack. In driving the machine over the field or at any other time when the guide wheel 18 is in contact with the ground but not in a furrow, the engine may be steered, at will, either straight ahead or on a curve or turn, simply by manipulation of the hand wheel or steering wheel 8. In following a furrow in the plowing action, for example, the guide wheel 18 runs in the furrow just previously formed, and by slight adjustment of its axis 19, it may be set so that it will hug one side of the furrow with the desired side thrust. Obviously, the engine may be steered by manipulation of the wheel 8, even if the guide arm 12 be raised so as to lift the guide wheel 18 out of contact with the ground.

The chief purpose of the adjustable stops 23 is to limit the movements of the guide axle 19, so that the guide wheel cannot be thrown into contact with the guide arm 12, nor with the shoe 28. The lateral adjustment of the guide arm 12 is for the purpose of off-setting the guide wheel 18, so that it will be properly set for gangs containing different numbers of plows. The expression "pivoted front axle" is herein used in a sense broad enough to include an adjustment wherein the front wheels are journaled on stub axles pivoted to the ends of the main axle proper, on the plan employed in automobiles.

What I claim is:

1. The combination with a traction engine having a pivoted front axle, of a guide arm extending forward from said front axle and pivotally connected thereto for vertical movements, but partaking of the horizontal oscillatory movements of said axle, a guide wheel connected to and supporting the front end of said guide arm, and a shoe attached to the front end of said guide arm, constituting a forward extension thereof, and projecting forward of the front portion of said guide wheel on a line above the bottom thereof, the said guide wheel being laterally offset at one side of said arm and shoe.

2. The combination with a traction engine having a pivoted front axle, of a guide arm extended forward from said front axle and pivotally connected thereto, for vertical movements, but subject to the horizontal oscillatory movements of said axle, a guide wheel connected to and supporting the front end of said guide arm, and a shoe at the front end of said guide arm projecting in front of said guide wheel, on a line above the bottom of said wheel, and engageable with the ground when said guide wheel drops into a depression, the said shoe being formed from a flat metal bar bent approximately U-shaped with its rear ends rigidly secured to the front end of said guide arm.

3. The combination with a traction engine having a pivoted front axle, of a guide arm projecting forwardly from said guide axle, pivotally connected thereto for vertical movements but subject to the horizontal oscillatory movements of said axle, a guide axle pivoted to the front end of said guide arm, a guide wheel journaled to said guide axle, and an adjustable stop limiting the oscillatory movements of said guide axle.

4. The combination with a traction engine having a pivoted front axle, of a guide arm projecting forwardly from said axle and pivotally connected thereto for vertical movements but subject to the oscillatory movements of said front axle, a guide axle intermediately pivoted to the front end of said guide arm, a guide wheel journaled to one end of said guide axle, a steering connection attached to the other end of said guide axle, and adjustable front and rear stops on the front end of said guide arm for limiting the oscillatory movements of said guide axle.

5. The combination with a traction engine having a pivoted front axle, of a guide arm projecting forwardly from said steering axle and pivotally connected thereto for vertical movements but subject to the horizontal oscillatory movement of said axle, a straight guide axle intermediately pivoted to the front end of said guide arm, a guide wheel journaled to one end of said guide axle and a steering attachment connected to the other end of said guide axle, the front end of said guide arm being axially twisted, and thereby set obliquely so that the said guide wheel will stand in an oblique position.

6. The combination with a traction engine having a pivoted front axle, of a guide arm projecting forwardly from said front axle, and adjustable pivotal connections between said front axle and the rear end of said guide arm permitting said guide arm to move vertically and adapting the front end of the same to be variably offset laterally, and a guide wheel connected to and supporting the front end of said guide arm.

7. The combination with a traction engine having a pivoted front axle, of a guide arm projecting forward from said front axle and pivotally connected thereto for vertical movements, adjustable connecting devices between the rear end of said guide arm and said front axle permitting the front end of said guide arm to be variably offset laterally, a guide axle pivoted to the front end of the said guide arm, a guide wheel journaled to said guide axle, and steering connections attached to said guide axle for oscillating the same horizontally.

In testimony whereof I affix my signature in presence of two witnesses.

CHARLES S. WHITWORTH.

Witnesses:
H. B. BOIES,
ARTHUR EDWARDS.

Copies of this patent may be obtained for five cents each, by addressing the "Commissioner of Patents, Washington, D. C."